United States Patent [19]

Pan et al.

[11] Patent Number: 5,445,319

[45] Date of Patent: Aug. 29, 1995

[54] TORCH FOR MANUFACTURE OF OPTICAL FIBER COUPLERS AND METHOD OF MANUFACTURE

[75] Inventors: Jing-Jong Pan; Ming Shih, both of Milpitas; Zhong M. Mao, San Jose; Frank Y. F. Liang, San Jose; Kung Shih, San Jose, all of Calif.

[73] Assignee: E-Tek Dynamics, Inc., San Jose, Calif.

[21] Appl. No.: 4,041

[22] Filed: Jan. 15, 1993

[51] Int. Cl.6 .................... G02B 6/26; C03B 37/15
[52] U.S. Cl. ........................... 239/1; 239/589; 385/96
[58] Field of Search ............. 239/1, 13, 589, 591, 239/DIG. 2, DIG. 19; 385/96

[56] References Cited

U.S. PATENT DOCUMENTS

| | | | |
|---|---|---|---|
| 1,840,196 | 1/1932 | Hasse | 239/591 |
| 1,958,085 | 5/1934 | Hammon | 239/589 |
| 2,175,160 | 10/1939 | Zobel et al. | 239/589 |
| 2,343,958 | 3/1944 | Crowe | 239/DIG. 19 |
| 2,373,309 | 4/1945 | Hamilton | 239/589 |
| 3,220,459 | 11/1965 | Wilson | 239/79 |
| 4,895,423 | 1/1990 | Bilodeau et al. | 385/96 |
| 5,171,345 | 12/1992 | Takemura | 385/96 |

FOREIGN PATENT DOCUMENTS 2365275  4/1978  France .............. 239/DIG. 19

*Primary Examiner*—Karen B. Merritt
*Attorney, Agent, or Firm*—Townsend and Townsend Khourie and Crew

[57] ABSTRACT

A torch specifically adapted for the manufacture of optical fiber couplers is provided. The torch has a rod and nozzle of, preferably machinable, ceramic. The rod has an inlet for connection to a gas supply source, an outlet, and a gas channel connecting the inlet to the outlet. The nozzle has an inlet for receiving gas from the rod outlet, and an enlarged outlet connected to the nozzle inlet for discharging gas for ignition. The shapes and dimensions of the parts of the torch can be modified for the specific manufacturing requirements for an optical fiber coupler. During the manufacture of optical fiber couplers, the torch can be maintained in an ignited state so that the fusing of optical fibers can be performed uniformly and reliably.

7 Claims, 3 Drawing Sheets

TORCH FOR MANUFACTURE OF OPTICAL FIBER COUPLERS AND METHOD OF MANUFACTURE

BACKGROUND OF THE INVENTION

The present invention is related to manufacturing techniques for optical fiber couplers and, more specifically, a torch useful in fusing optic fibers in an optical coupler.

In the manufacture of optical fiber couplers, optic fibers are typically fused together. In a general manufacturing process, two or more optical fibers having their outer coating removed are brought together and placed in contact with each other. The fibers may, or may not, be twisted together, depending upon the particular technique used to manufacture the coupler. Then a gas torch is brought close to the fibers and the flame from the torch placed in contact with the fibers. As the fibers are fused together by the flame's heat, the fibers are placed under tension by slowly and carefully pulling them apart at a predetermined rate.

Heretofore, torches with metal nozzles, such as illustrated in FIG. 1, have been used. These torches have certain disadvantages. The torches cannot be maintained in an ignited state because the temperature of the nozzles climb so high as to melt the nozzles. Therefore, the torches are lit for a fusing operation and then shut off until the next operation. This creates an additional step in the manufacturing operation, whether performed manually or by automated equipment. Another disadvantage is that nozzles tend to leave metal impurities in the fused fibers, thereby reducing optical performance.

The present invention solves or substantially mitigates any of these problems.

SUMMARY OF THE INVENTION

The present invention provides for a torch for the manufacture of optical fiber couplers comprising a rod having an inlet for connection to a gas supply source, an outlet, and a gas channel connecting the inlet to the outlet. The torch also has a, preferably machinable, ceramic nozzle with an inlet for receiving gas from the rod outlet, and an outlet connected to the nozzle inlet for discharging gas for ignition. The torch can be maintained in an ignited state during the manufacture of fiber optic couplers so that the fusing of optical fibers can be performed uniformly and reliably. The torch is also shaped and dimensioned for specific manufacturing requirements for a optical fiber coupler.

During the manufacture of the optical fiber coupler, the present invention allows for supplying gas to the nozzle, igniting the torch to create a flame, applying the flame to a plurality of optic fibers aligned in close proximity to each other such that the optic fibers fuse to each other, and maintaining the torch in an ignited state for the next fusion operation. In this manner the torch is maintained in a steady-state condition and optical fiber couplers can be manufactured reliably and reproducibly.

DETAILED DESCRIPTION OF PREFERRED EMBODIMENTS

Figure 2:
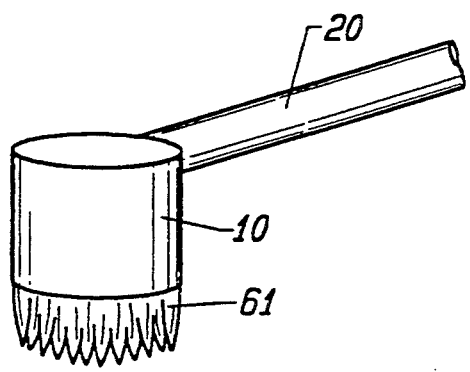
FIG. 2 is a perspective view of a torch according to one embodiment of the present invention.

In accordance with the present invention, the torch used in manufacturing optical couplers is formed from ceramic. The torch is manufactured out of a machinable glass ceramic. MACOR, a registered trademark of Corning Glass Company of Corning, N.Y., ceramic is preferred. As shown in FIG. 2, one embodiment of the present invention is formed with a nozzle 10 and a rod 20. The rod 20 is connected at one end to a gas supply which then transfers a flammable gas through the rod 20 into the nozzle 10 for a flame 61.

Figure 3A:
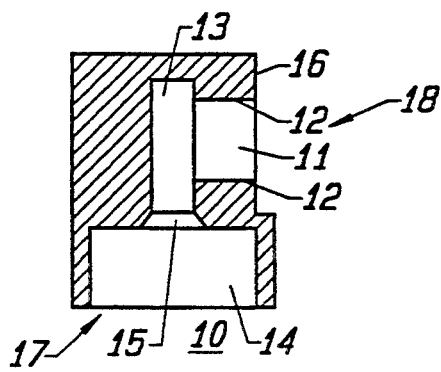
FIG. 3A is a cross-sectional view of the nozzle of the torch shown in FIG. 2.

FIG. 3A is a cross-sectional view of the nozzle 10. The exterior of the nozzle 10, in the form of a cylinder, has a flat portion 16 in the side of the cylinder. The flat portion 16 receives the rod 20 at an inlet 18. The inlet 18 has a circular opening 11 which is connected into a cylindrical passage 13 of approximately 0.1 inches diameter. The opening 11 has threads 12 on the walls of the body of the torch 10. Through a chamfered portion 15, the passage 13 is connected to an opening 14 of approximately 0.4 inches in diameter which forms the outlet 17 for the nozzle 10. The outlet 17 has a much larger cross-sectional area than the passage 13.

The rod 20, also formed from machinable ceramic to match any expansion of the heated nozzle 10, has a basic cylinder shape with a gas passage 25 centered about a central axis 21. By a friction coupling, one end 23 of the rod 20 receives a flexible hose (not shown) which is connected to the gas supply. At an opposite end 24 of the rod 20, threads 22 are formed on the outside of the rod 20. The threads 22 mate with the threads 12 of the nozzle inlet 11 so that the nozzle 10 and rod 20 form a threaded coupling. The diameter of the passage 25 is the same as that of the nozzle passage 13.

With the nozzle 10 and rod 20 formed from machinable ceramic, the various openings and passages can be easily formed by drilling and other standard machining techniques. For example, the threads 12 and 22 are formed with tap or die.

In operation, gas enters the rod end 23 and travels down the passage 25 into the passage 13 of the nozzle 10. The gas flow direction in the nozzle is perpendicular to the flow of the gas in the rod 20. Upon reaching the opening 14, which has a cross-sectional area much larger than that of the passage 13, the gas mixes with the oxygen in the atmosphere and ignites. The gas flow velocity is also substantially reduced so that the flame from the nozzle has a reduced gas pressure.

Figure 1:
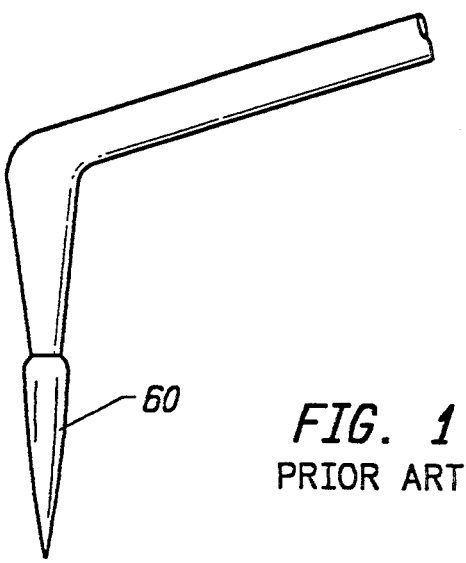
FIG. 1 illustrates a torch with a metal nozzle, which is found in the prior art, for fusing optical fibers.

As shown in FIG. 1, the flame 60 of the metal nozzle of a prior art torch is shown as rather pointed, indicative of a certain amount of gas pressure in a comparative small amount of cross-sectional area. With the same amount of gas pressure in the central passage 13, the flame 61 from the nozzle 10 in the torch shown in FIG.

2 is dispersed over a greater cross-sectional area. The outlet gas pressure of the nozzle 10 is low compared to that illustrated in FIG. 1. In the manufacture of fiber optic couplers, the low gas pressure from the flame of the nozzle 10 is desirable since the unwanted displacement of the very thin and light fibers is avoided. The sensitivity of the manufacturing process is accounted for.

The flame (and heat) is dispersed over a wider area and permits fusing of optical fibers over a greater length than the torch of FIG. 1. The pointed flame of the prior art torch either touches a length of optical fibers at a single point if the tip of the torch is used, or at two points if the optical fibers are emersed in the flame. In the latter case, the portion of the fibers between the two points are exposed to the pressure of the unignited gas stream to risk unwanted displacement of the fibers during the fusing operation.

The torch of the present invention is also effective in avoiding contamination of the optical coupler during its manufacture. The metal nozzles of the torches presently in use typically oxidize to a certain degree. Oxides permit the introduction of metal particles into the fused portion of the coupler, which cause highly undesirable losses due to scattering and absorption of the light signal. Oxidation furthermore reduce the useful lifetime of the torch and metal torches must be replaced more often than those of the present invention.

Another, subtle, advantage of the torch according to the present invention is dimensional stability of the torch. The described ceramic has a much lower thermal expansion than, say, copper, which is often used in present torches. This dimensional stability leads to a more stable operation since the dimensions of the torch remain substantially constant at all stages of the manufacturing operation. The described ceramic also has a much lower thermal conductivity than metal. This also permits for a more stable and safer manufacturing operation since parts connected to the torch are not heated to any substantial degree.

Thus a highly effective torch is realized for manufacturing fiber optic couplers. Presently torches are ignited just before the fusing operation of the optical fibers and turned off immediately thereafter to prevent the metal of the torch from melting. The torches are never maintained in a constant state. The reproduction of the precise conditions for each fusing operation is approximated at best.

On the other hand, after the torch of the present invention is supplied with gas, it is ignited and the torch is maintained in an ignited state before and after the fusing operations. This permits the torch to settle into a steady-state condition so the conditions for fusing the fibers are reproduced time after time. Since the flame from the torch has been left on, its heat is constant and the closely held optical fibers, which have had their jackets removed, have their cladding and/or cores fused together in a reliable and predictable manner. Furthermore, with the torch according to the present invention, the gas pressure from the flame is reduced to prevent any displacement of the fibers from the desired position. After the fusing of fibers for one optical fiber coupler, the torch is removed but left on for the next fusing operation. In this manner, the temperature of the torch is constant, which permits very high, and consistent, quality couplers to be manufactured in a very sensitive process.

While the torch can be used in manual operation, it is particularly well suited for automated manufacturing. Once ignited, the torch is left on. The extra steps of repeatedly turning on the gas supply, igniting the torch, and turning off the gas supply to kill the lit torch for each fusing operation is eliminated. Time is saved and complexity avoided.

It should be noted that the dimensions and the shapes of the various elements of the torch described above are selected to deliver a flammable gas, such as $H_2$, $H_2$ and $O_2$, or propane ($C_3H_3$) and $O_2$, at a proper pressure for a proper and uniform distribution of the flame over a length of optical fibers forming the coupler. Due to the myriad combinations of manufacturing parameters, it has been found that particular dimensions and shapes for a torch, are optimized by empirical observation. The torch with the particular dimensions and shapes described above, for example, has been found to work best with a standard sized coupler for 125 micron, single mode fibers, having a coupling (fused) length of 5.8 mm. as the two fibers are pulled part at a predetermined rate. A typical length of the completed optical fiber coupler is approximately 65 mm. inches, including its package.

For other applications the dimensions and shapes of the elements of the present invention may vary. For example, FIGS. 5A–5B, 6 and 7 illustrate a torch according to the present invention which is modified for miniature optical fiber couplers. Miniature fiber optic couplers have total package lengths of 1 to 1.2 inches. Correspondingly the fused length of the fibers must be shortened from that of a standard sized coupler.

Figure 3B:
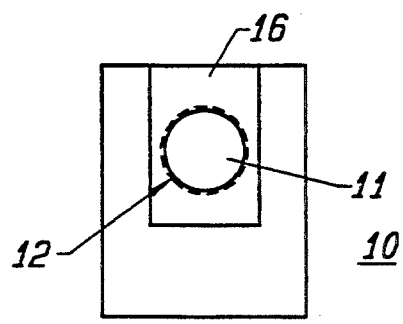
FIG. 3B is a side view of the torch of FIG. 3A.
Figure 4:
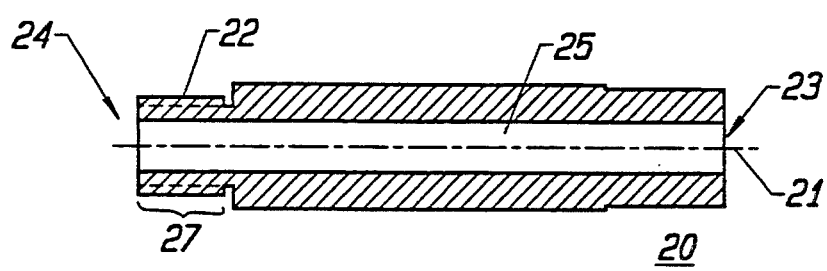
FIG. 4 is the rod of the torch shown in FIG. 2.
Figure 5A:
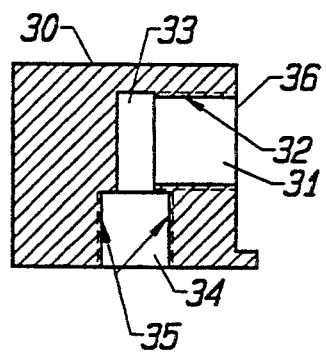
FIG. 5A is a cross-sectional view of an adapter of a torch according to another embodiment of the present invention.
Figure 5B:
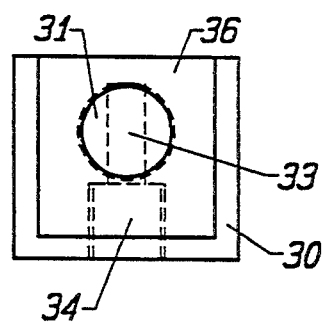
FIG. 5B is a side view of the adapter of FIG. 5A.
Figure 6:
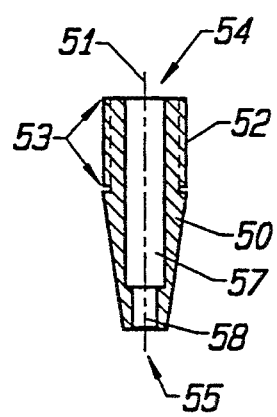
FIG. 6 is a nozzle for the adapter of FIGS. 5A and 5B.
Figure 7:
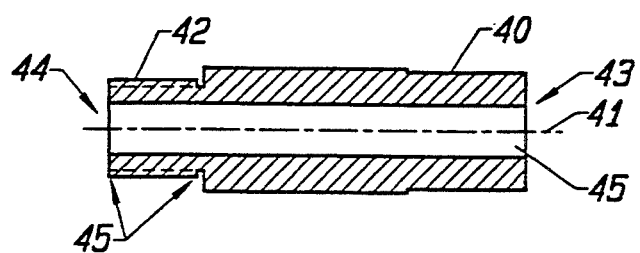
FIG. 7 is a cross-sectional view of the rod for the connection to the adapter of FIGS. 5A and 5B.

The torch for miniature fiber optic couplers has a gas supply rod 40, an adaptor 30 and a nozzle 50, all formed from machinable glass ceramic. The gas supply rod 40 shown in FIG. 7 with its central gas passage 45 from one end 43 to the other end 44 of the cylindrically shaped rod is similar to the rod 20 illustrated in FIG. 4. Threads 42 are placed at the end 44 of the rod 40 to engage threads 32 in the inlet 31 of the adaptor 30. The adapter 30 is a variation of the nozzle 10 illustrated in FIGS. 3A and 3B. However, instead of an outlet opening, the adapter 30 has a coupling opening 34. Thus gas passing through the rod 40 enters a channel 33 having a diameter of approximately 0.080 inches. The channel 33 guides the gas toward the opening 34. Threads 35 are formed around the circular opening 34 to engage matching threads 52 on a nozzle 50.

The nozzle 50 forms a cylindrical taper around a central axis 51 with an inlet 52 and an outlet 55 which is connected by a central channel 57. The threads 52 are machined around the outside of the inlet end of the nozzle 50. The channel 57, having a diameter of approximately 0.060 inches is connected to the outlet 55 by a second channel 58 having a diameter in the range from 0.020 to 0.040 inches. In this manner, a small flame of different size can be created such that optical fibers are fused along a very short length compared to that of a standard sized coupler.

Thus the present invention allows for easy adaption to different requirements for manufacturing optical fiber couplers.

While the above is a complete description of the preferred embodiments of the present invention, various alternative, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. A torch for the manufacture of optical fiber couplers comprising:
   a ceramic rod having a first end for connection to a flammable gas supply source, a second end, and a gas channel connecting said first end to said second end; and
   a ceramic nozzle having an inlet for receiving flammable gas from said second end, and an outlet connected to said inlet for discharging said gas from said gas supply for ignition;
   wherein said nozzle has a gas channel connecting said inlet to said outlet, said channel having a cross-sectional area; and said outlet has an opening having a cross-sectional area larger than said channel cross-sectional area so that gas pressure of a flame from said outlet is reduced; and
   whereby said torch can be maintained in a ignited state during the manufacture of fiber optic couplers.

2. A torch for the manufacture of optical fiber couplers comprising
   a rod having a first end for connection to a gas supply source, a second end, and a gas channel connecting said first end to said second end, said channel having an approximate diameter of 0.1 inches, and
   a nozzle having an inlet engaging said second end, an outlet for discharging gas from said gas supply, and a gas channel connecting said inlet to said outlet, said channel having a cross-sectional area; and said outlet having an opening having a cross-sectional area larger than said channel cross-sectional area so that gas pressure of a flame from said outlet is reduced.

3. The torch of claim 2 wherein said nozzle comprises machinable ceramic so that said torch can be maintained in an ignited state during the manufacture of optical fiber couplers.

4. The torch of claim 3 wherein said rod comprises machinable ceramic.

5. A method of manufacturing optical fiber couplers comprising
   providing a gas torch, said torch having a ceramic nozzle for discharging a flammable gas through a gas outlet;
   supplying said flammable gas through a channel connected to said gas outlet of said nozzle to that gas pressure from said outlet is reduced;
   igniting said gas from said nozzle to create a flame from said nozzle;
   applying said flame to a first plurality of optic fibers aligned in close proximity to each other such that the first plurality of optic fiber fuse to each other;
   maintaining said torch in an ignited state for a next fusion operation; and
   applying said flame to at least a second plurality of optic fibers aligned in close proximity such that each plurality of optic fibers fuse;
   whereby said torch is maintained in a steady-state condition and a plurality of optical fiber couplers can be manufactured reliably and reproducibly.

6. The method of claim 5 wherein said torch providing step comprises machining said ceramic nozzle.

7. A torch for the manufacture of optical fiber couplers comprising:
   a rod having a first end for connection to a gas supply source, a second end, and a gas channel connecting said first end to said second end, said channel having an approximate diameter of 0.1 inches or less; and
   a ceramic nozzle having an inlet for receiving gas from said second end, and an outlet connected to said inlet for discharging gas from said gas supply for ignition;
   whereby said torch can be maintained in an ignited state during the manufacture of fiber optic couplers.

* * * * *